(12) United States Patent
Nerenberg (10) Patent No.: US 7,968,138 B2
(45) Date of Patent: Jun. 28, 2011

(54) FOOD SWEETENER

(76) Inventor: Arnold Nerenberg, Whittier, CA (US)

( * ) Notice: Subject to any disclaimer, the term of this patent is extended or adjusted under 35 U.S.C. 154(b) by 1713 days.

(21) Appl. No.: 10/897,468

(22) Filed: Jul. 23, 2004

(65) Prior Publication Data

US 2006/0019011 A1  Jan. 26, 2006

(51) Int. Cl.
*A23L 1/236* (2006.01)
(52) U.S. Cl. ............. 426/548; 426/72; 426/74; 426/541
(58) Field of Classification Search ............. 426/72, 426/73, 74, 541, 542, 548
See application file for complete search history.

(56) References Cited

U.S. PATENT DOCUMENTS

| | | | |
|---|---|---|---|
| 4,613,512 A | 9/1986 | Barnett et al. | |
| 4,828,820 A | 5/1989 | Glass et al. | |
| 4,828,845 A | 5/1989 | Zamudio-Tena et al. | |
| 5,017,400 A | 5/1991 | Olinger et al. | |
| 5,082,671 A * | 1/1992 | Cherukuri | 426/3 |
| 5,098,730 A | 3/1992 | Pepper et al. | |
| 5,443,830 A | 8/1995 | Moore et al. | |
| 5,645,881 A | 7/1997 | Tancibok et al. | |
| 5,935,600 A | 8/1999 | Cherukuri et al. | |
| 6,159,942 A | 12/2000 | St. Cyr et al. | |
| 6,159,943 A | 12/2000 | Butler et al. | |
| 6,703,057 B2 | 3/2004 | Duffett | |
| 7,186,431 B1 * | 3/2007 | Silver | 426/548 |
| 2001/0002271 A1 * | 5/2001 | Duffett | 426/285 |
| 2002/0065232 A1 | 5/2002 | Butler et al. | |
| 2003/0045482 A1 | 3/2003 | Kenyon | |
| 2003/0068791 A1 | 4/2003 | Miasnikov et al. | |
| 2003/0095929 A1 | 5/2003 | Stier et al. | |
| 2003/0125588 A1 | 7/2003 | Heikkila et al. | |
| 2004/0013693 A1 | 1/2004 | Bobotas et al. | |
| 2004/0076728 A2 | 4/2004 | Merkel et al. | |
| 2004/0077530 A1 | 4/2004 | Portman | |

* cited by examiner

*Primary Examiner* — Leslie Wong
(74) *Attorney, Agent, or Firm* — Schmeiser, Olsen & Watts, LLP

(57) ABSTRACT

A food sweetener including xylitol and D-ribose, a method of forming the food sweetener, a food product that includes the food sweetener, and a method of forming the food product. The food sweetener may be formed to have a fixed shape by being heated at an elevated temperature followed by being cooled to the temperature of the ambient atmosphere. The food product may be formed by heating or cooling a mixture of ingredients which include the xylitol, the D-ribose, and at least one other ingredient that does not contain a sweetening agent.

32 Claims, 6 Drawing Sheets

FOOD SWEETENER

BACKGROUND OF THE INVENTION

1. Technical Field

The present invention relates to a food sweeter, a food product, and associated method of formation.

2. Related Art

Sucrose and other sugars are sweeteners that may be adverse to health by generating an insulin spike when ingested, which is adverse for diabetics and for control of body weight. Artificial sweeteners may also be adverse to health by contributing to the cause of such diseases as cancer.

Thus there is a need for a sweetener that is not adverse to health.

SUMMARY OF THE INVENTION

The present invention provides a food sweetener, comprising xylitol and D-ribose, wherein if the food sweetener consists of the xylitol, the D-ribose, and at least one other ingredient then the at least one other ingredient does not include a sweetening agent.

The present invention provides a food structure, comprising a food product, wherein the food product consists of xylitol, D-ribose, and at least one other ingredient, and wherein the at least one other ingredient does not include a sweetening agent The present invention provides a food preparation method, said method comprising:

provid­ing xylitol and D-ribose each in a granular or powder form; and forming a mixture of ingredients consisting of the xylitol, the D-ribose, and at least one other ingredient, wherein the at least one other ingredient does not include a sweetening agent; and processing the mixture to form a food product.

The present invention provides a method of forming a food product, comprising:

providing a loose mixture comprising xylitol and D-ribose, wherein the loose mixture has a granular or powder form, and wherein if the loose mixture consists of the xylitol, the D-ribose, and at least one other ingredient then the at least one other ingredient does not include a sweetening agent;

heating the loose mixture at an elevated temperature and for a time duration sufficient to convert the loose mixture to a modified mixture; and cooling the modified mixture to the ambient room temperature, wherein after said cooling, the xylitol and D-ribose are bound to each other such that the modified mixture has a fixed shape and is not loose.

The present invention provides a sweetener that is not adverse to health and additionally provides health benefits.

DETAILED DESCRIPTION OF THE INVENTION

The present invention discloses a food sweeter and associated method of formation, wherein the food sweetener comprises xylitol and D-ribose. The present invention also discloses a food product that includes said food sweetener. A "food product" is defined as a food, a food supplement, or a combination thereof. A food supplement is defined as a nutritional supplement adapted to be ingested by a human or veterinary animal for a nutritional purpose or a health benefit. In one embodiment, if said food sweetener or food product consists of the xylitol, the D-ribose, and at least one other ingredient, then the at least one other ingredient does not include a sweetening agent. A "sweetening agent" is defined as an additive to a food or food supplement, wherein said additive adds sweetness to the food or food supplement.

Xylitol and D-ribose are pentose sugars. Xylitol and D-ribose provide health benefits. For example, xylitol does not create insulin spikes when ingested, prevents tooth cavities, and assists in the treatment of middle ear infections. As another example, D-ribose energizes the heart. In addition, D-ribose is a cortisol suppressor and is also beneficial for combating dry mouth. In combination, D-ribose and xylitol has a delicious taste even if ingested without any added ingredient.

In combination, D-ribose and xylitol may be combined with other nutritional additives (e.g., vitamin, mineral, antioxidant, etc.). In combination, D-ribose and xylitol may be used as a nutritious and gourmet sweetener to any food or food product for which adding a sweetener is desirable. For example, D-ribose and xylitol may be added in combination to coffee, tea, etc., and accordingly may be stored in individual packets for convenient usage with coffee or tea. In combination, D-ribose and xylitol may be used as a sweetener component of a food (e.g., snack food) or food product such as candy, ice cream, ice milk, frozen yogurt, cake, pie, etc. In combination, D-ribose and xylitol may be substituted for sucrose in any food or food product in which sucrose is used or could be used. In combination, D-ribose and xylitol may be comprised by a food product such that the food product is in liquid form, solid form, or in a solid and liquid form. In combination, D-ribose and xylitol may be eaten as candy. All of the preceding uses and benefits of D-ribose and xylitol in combination may be utilized by human beings and veterinary animals.

For any mixture or combination of D-ribose and xylitol disclosed herein as a sweetener, food product, additive to a food product, etc., there are embodiments of the present invention in which said mixture or combination is not comprised by: a coating of a comestible; a chewing gum; or a chewable comestible unit.

Xylitol and D-ribose may each be readily obtained, such as inter alia in a powder or granular form, from commercial sources such as health food stores, mail order, Internet web sites, etc.

Figure 1:
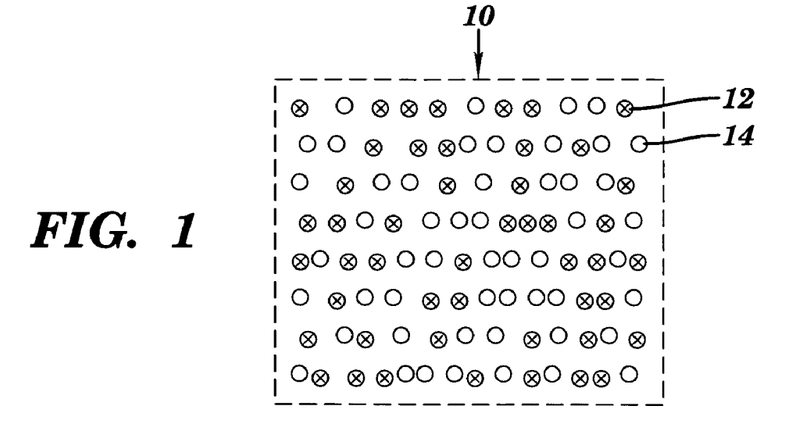
FIG. 1 depicts a non-uniform mixture of xylitol and D-ribose, in accordance with the embodiments of the present invention.
Figure 2:
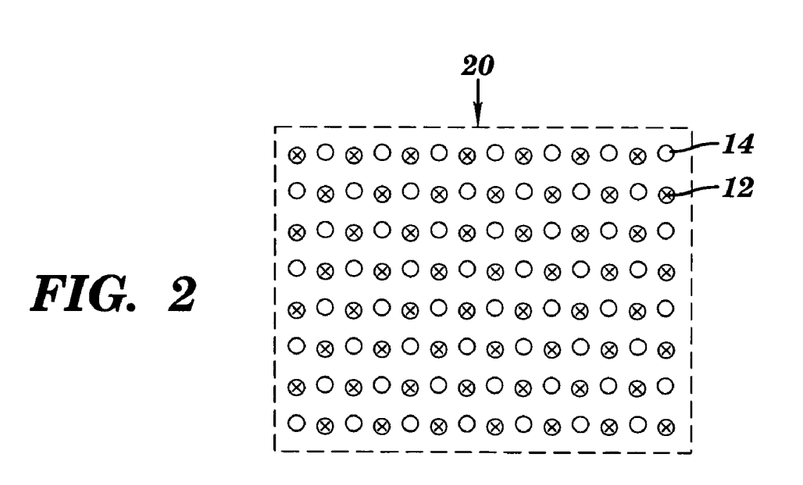
FIG. 2 depicts a uniform mixture of xylitol and D-ribose, in accordance with the embodiments of the present invention.

FIG. 1 depicts a non-uniform mixture 10 of xylitol 12 and D-ribose 14, in accordance with the embodiments of the present invention. FIG. 2 depicts a uniform mixture 20 of xylitol 12 and D-ribose 14, in accordance with the embodiments of the present invention. The mixture 20 of FIG. 2 may be made from the mixture 10 by, stirring, shaking, etc., the mixture 10 until the xylitol 12 and D-ribose 14 are about uniformly distributed therewithin.

The mixture 10 or 20 may be in any form such as, inter alia, a powder of granular form. The mixture 10 or 20 may be loose mixture. Alternatively, the mixture 10 or 20 may have a fixed shape in which the xylitol 12 and D-ribose 14 are adhesively bound within the mixture 10 or 20, as will be discussed infra in conjunction with FIGS. 4-8.

In FIG. 1, the mixture 10 or 20 may be used as a food product or as a sweetener to a food product. The xylitol 12 and D-ribose 14 in the mixture 10 or 20 may be distributed in any proportionality. For example, the weight percent (W) of xylitol may comprise any of the following representative ranges (or any combination thereof) of W as a percentage of the combined weight of the xylitol 12 and the D-ribose 14 in the mixture 10 or 20: $1 \leq W < 5$; $5 \leq W < 10$; $10 \leq W < 15$; $15 \leq W < 20$; $20 \leq W < 25$; $25 \leq W < 30$; $30 \leq W < 35$; $35 \leq W < 40$; $40 \leq W < 45$; $45 \leq W < 50$, $50 \leq W < 55$; $55 \leq W < 60$; $60 \leq W < 65$; $65 \leq W < 70$; $70 \leq W < 75$; $75 \leq W < 85 \leq W < 90$, $90 \leq W < 95$; and $95 \leq W \leq 99$.

In one embodiment, the mixture 10 or 20 when used as a sweetener may consist essentially of the xylitol 12 and the D-ribose 14. Consisting essentially of the xylitol 12 and the D-ribose 14 means that the mixture 10 or 20 does not include any additional ingredient other than an impurity, packaging material, preservative, anti-caking substance (e.g., silicon dioxide).

Figure 3:
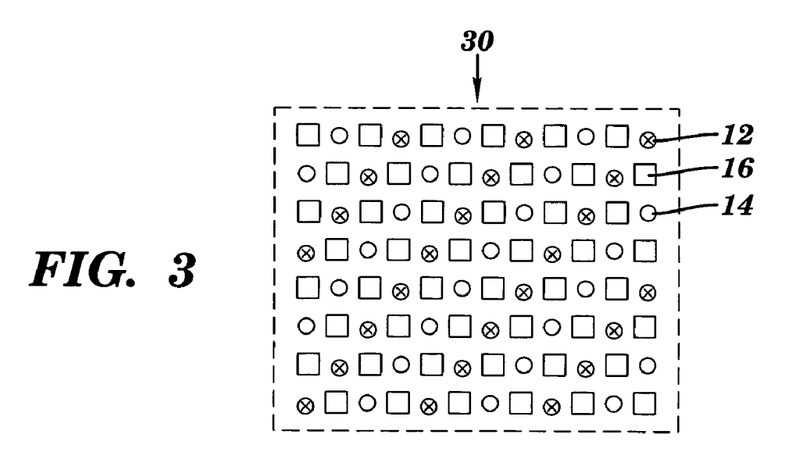
FIG. 3 depicts a mixture of xylitol, D-ribose, and at least one other ingredient, in accordance with the embodiments of the present invention.

FIG. 3 depicts a mixture 30 of xylitol 12, D-ribose 14, and at least one other ingredient 16, in accordance with the embodiments of the present invention. The mixture 30 may be a food product (i.e., a food, a food supplement, etc.) such as the food product 58 of FIG. 11, discussed infra. The mixture 30 may be an initial mixture used for making a food product such as the mixture of ingredients 54 of FIG. 9 or 10, discussed infra. The at least one other ingredient 16 may comprise a flavoring (e.g., vanilla, chocolate, etc.) and/or at least one nutritional additive such as a vitamin, mineral, antioxidant, etc. The at least one other ingredient 16 may comprise, inter alia: a baking mixture (e.g., flour, eggs, etc.); a freezing mixture in or for ice cream, ice milk, etc. (e.g., cream, fruit, chocolate pieces, etc.); a cooking mixture such as sweet and sour pot roast (beef pieces, lemon juice, water, etc.); a mixture to be cooled or has been cooled such (e.g., ingredients of vanilla pudding, ingredients of lemonade), a boiled mixture or a mixture to be boiled (e.g., ingredients of hot chocolate drink).

Figure 4:
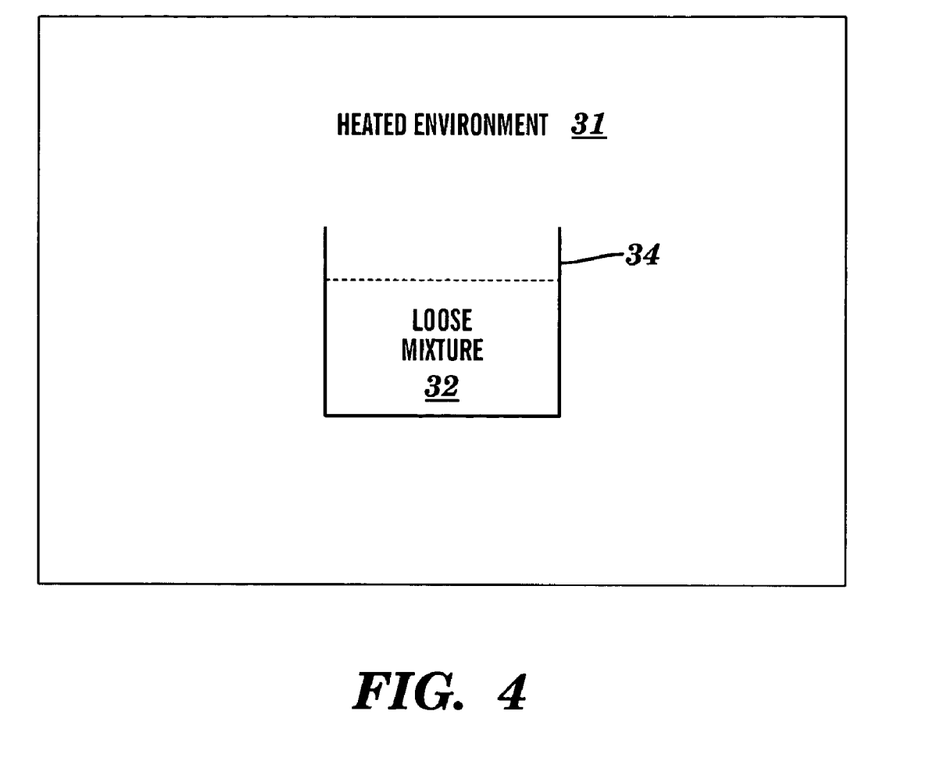
FIG. 4 depicts a loose mixture of xylitol and D-ribose in a heating environment, in accordance with the embodiments of the present invention.
Figure 5:
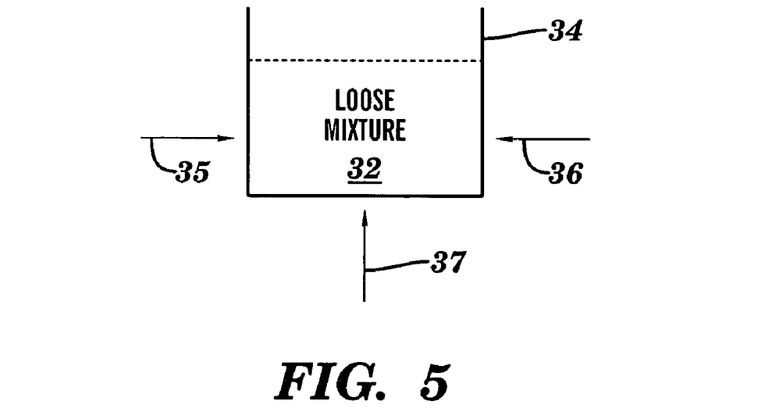
FIG. 5 depicts a loose mixture of xylitol and D-ribose being locally heated, in accordance with the embodiments of the present invention.

FIG. 4 depicts a loose mixture 32 of xylitol and D-ribose (similar to the loose mixture 10, 20, or 30 of FIG. 1, FIG. 2, or FIG. 3, respectively) in a heating environment 31, said loose mixture 32 being held in a container 34, in accordance with the embodiments of the present invention. The heating environment 31 is any environment (e.g., a heated room, an oven, sun exposure, etc.) in which the loose mixture 32 is heated to an elevated temperature sufficient to transform the loose mixture 32 into a modified mixture having a fixed shape in conformity with the geometrical shape of the container 34. Alternatively, FIG. 5 depicts the loose mixture 32 of xylitol and D-ribose being locally heated within the container 34, in accordance with the embodiments of the present invention. The arrows 35-37 represent heat flow into different surfaces of the container 34 from outside the container 34. The local heating may be generated by a local heater, a flame, etc., in accordance with the embodiments of the present invention.

The inventor of the present invention has found that by leaving the loose mixture 32 inside a parked automobile during a time duration in which the temperature of the interior air of the automobile was elevated relative to the temperature of the ambient atmosphere surrounding the automobile, the loose mixture 32 was transformed into a modified mixture having a fixed shape in conformity with the geometrical shape of the container 34. In general, the loose mixture 32 may be transformed into the modified mixture having the fixed shape, by heating the loose mixture 32 at an elevated temperature and for a time duration sufficient to convert the loose mixture 32 to the modified mixture such that the modified mixture has the fixed shape and is not loose.

The fixed shape is retained after the modified mixture has been cooled to the temperature of the ambient atmosphere. The cooling may take place naturally by exposing the heated modified mixture to the temperature of the ambient atmosphere.

Figure 6:
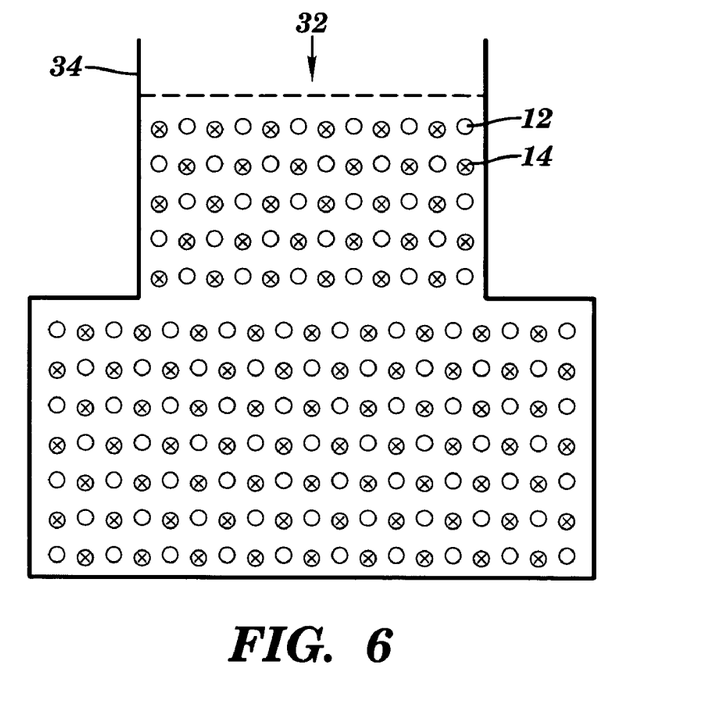
FIG. 6 depicts the loose mixture of xylitol and D-ribose of FIG. 4 or FIG. 5 in a container having a geometrical shape, in accordance with the embodiments of the present invention.
Figure 7:
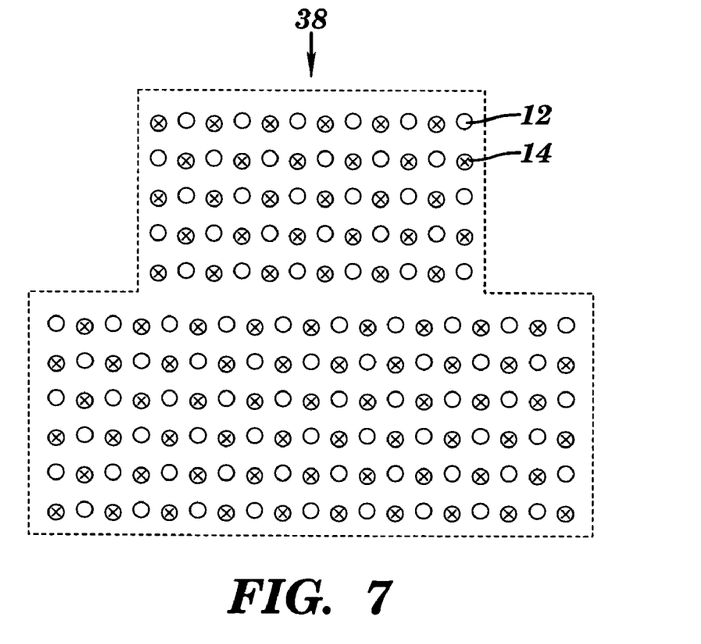
FIG. 7 depicts the xylitol and D-ribose of FIG. 6 having a fixed shape after having been heated and cooled, in accordance with the embodiments of the present invention.

FIG. 6 shows loose mixture 32 within the container 34 of FIGS. 4 and 5, wherein more details of the geometrical shape of the container 34 are depicted than in FIGS. 4 and 5, in accordance with the embodiments of the present invention. FIG. 7 depicts the xylitol and D-ribose of FIG. 6 having a fixed shape after being removed from the container 34 subsequent to having been heated, or subsequent to having been heated and cooled. As seen in FIG. 6, the removed xylitol and D-ribose has a shape that is in conformity with the geometrical shape of the container 34 of FIG. 6. The fixed shape may be used, inter alia, to form a snack food such as a snack bar or a lollipop containing a stick or other holder.

While the loose mixture 32 in FIG. 6 is illustrated as consisting essentially of xylitol 12 and D-ribose 14, the present invention includes embodiments relating to FIGS. 4-7 in which the loose mixture 32 does not consist essentially of the xylitol 12 and D-ribose 14, and includes at least one other ingredient in addition to the xylitol 12 and D-ribose 14 (e.g., the at least one other ingredient 16 of FIG. 3).

Figure 8:
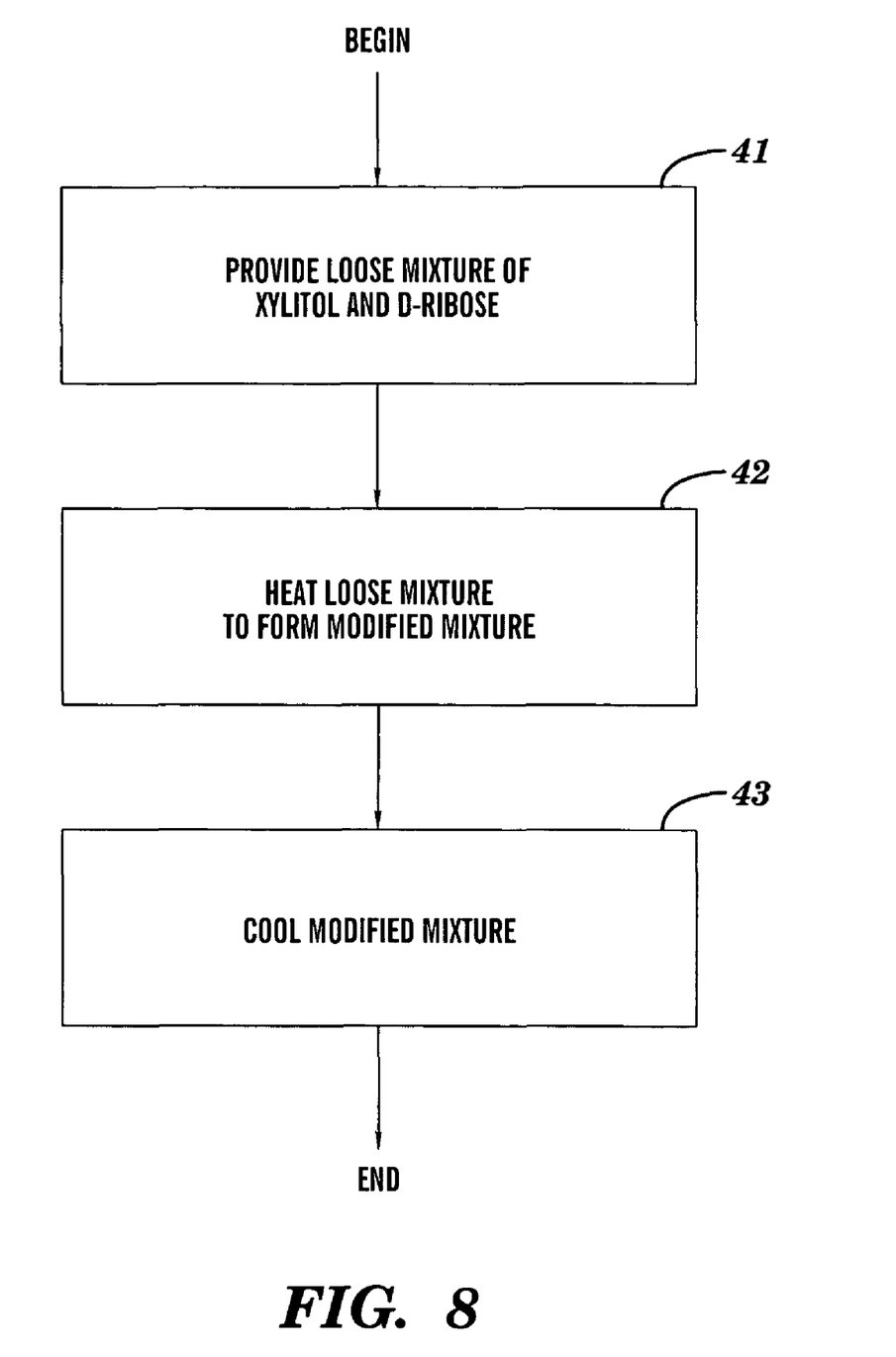
FIG. 8 is a flow chart describing the process associated with FIGS. 4-7 for forming a mixture of xylitol and D-ribose having a fixed shape, in accordance with the embodiments of the present invention.

FIG. 8 is a flow chart in which steps 41-43 describe the process associated with FIGS. 4-7 for forming a mixture of xylitol and D-ribose having a fixed shape, in accordance with the embodiments of the present invention. Step 41 provides the loose mixture 32 of xylitol 12 and D-ribose 14. Step 42 heats the loose mixture 32, in the heated environment 31 of FIG. 4 or by local heating as shown in FIG. 5, to form a modified mixture having a fixed shape in conformity with the geometrical shape of the container 34, as described supra. Step 43 cools the modified mixture form in step 42.

In further experimentation, the inventor of the present invention has determined the elevated temperature and time duration for which the loose mixture 32 was transformed into a fixed shape for various sample conditions, as shown in Table 1.

TABLE 1

| Sample Weight (gm) | Weight Percent of Xylitol (%) | Elevated Temperature (° F.) | Time Duration (min) |
|---|---|---|---|
| 8 | 90 | 375 | 4 |
| 32 | 90 | 375 | 9 |
| 16 | 60 | 375 | 2 |
| 25 | 60 | 375 | 3.5 |

As seen in Table 1, the elevated temperatures and time duration varies with sample conditions. Additionally, the elevated temperature and time duration are not independent, since a shorter time duration will be needed for a higher elevated temperature. For given sample parameters, a person of ordinary skill in the art may determine an elevated temperature and associated time duration without undue experimentation, such as inter alia by placing a sample of a loose mixture 32 in a closed volume (e.g., an oven) at as controlled temperature and observing the time duration required for the loose mixture 32 to be transformed into a fixed shape.

An application of the embodiment of FIGS. 4-8 is to form the fixed shape as a shape that would appeal to children and even to adults such as, inter alia, the shape of an animal (e.g., a dog, cat, etc.), an object (e.g., a doll, a football, etc.), etc.

Figure 9:
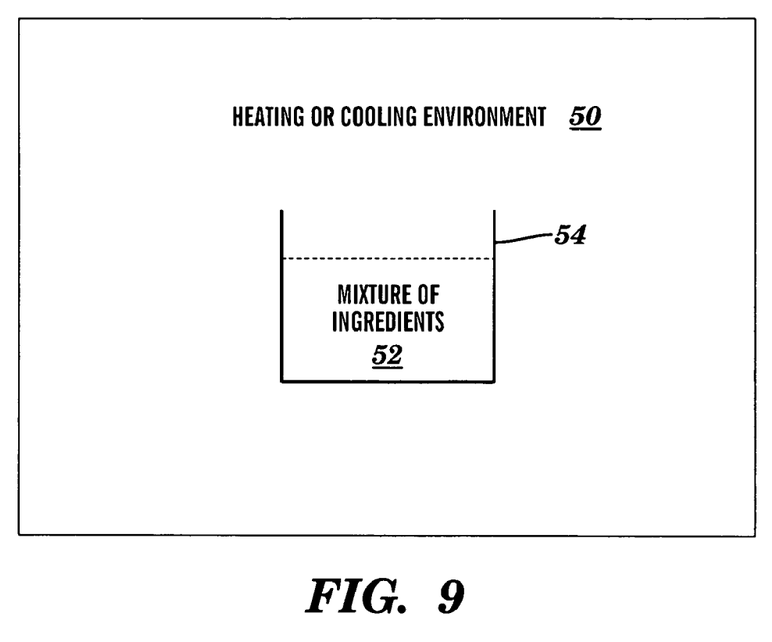
FIG. 9 depicts a mixture of ingredients, including xylitol and D-ribose and at least one other ingredient, in a heating or cooling environment, in accordance with the embodiments of the present invention.
Figure 11:
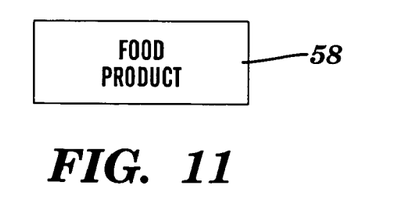
FIG. 11 depicts a food product from the mixture that was heated or cooled in relation to FIG. 9 or 10, in accordance with the embodiments of the present invention.

FIG. 9 depicts a mixture 52 of ingredients (e.g., the mixture 30 of FIG. 3), including xylitol and D-ribose and at least one other ingredient (e.g., the at least one other ingredient 16 of FIG. 3) in a container 54, in a heating or cooling environment 50 for forming a food product 58 as shown in FIG. 11, in accordance with the embodiments of the present invention. If the mixture 52 is being heated, then the heating environment 50 is any environment (e.g., a stove, a gas or electric oven, a microwave oven, a toaster, etc.) in which the mixture 52 is being heated to an elevated temperature sufficient to transform (e.g., broil, cook, bake, roast, toast, etc.) the mixture 52 into the food product 58 of FIG. 11. If the mixture 32 is being cooled (e.g., have its temperature lowered and/or being frozen), then the cooling environment 50 is any environment (e.g., a refrigerator, a freezer, etc.) in which the mixture 52 is being cooled and/or frozen sufficiently to transform the mixture 52 into the food product 58 of FIG. 11.

Figure 10:
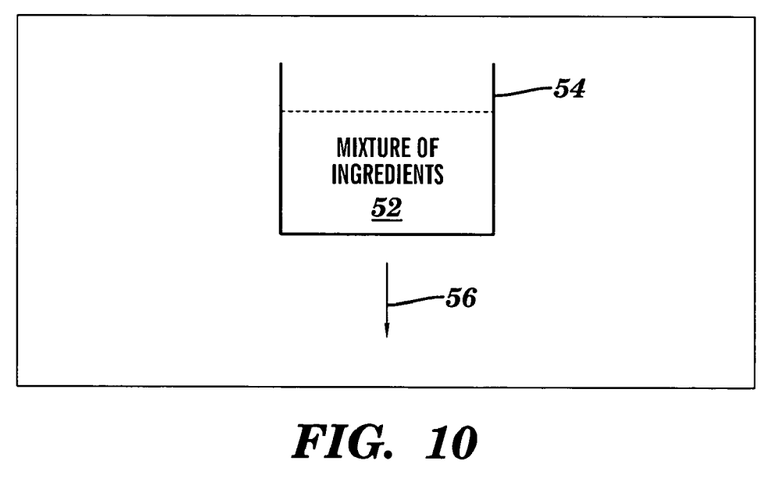
FIG. 10 depicts a mixture of ingredients, including xylitol and D-ribose, being locally cooled, in accordance with the embodiments of the present invention.

Alternatively, FIG. 10 depicts the mixture 52 as being locally cooled within the container 54, in accordance with the embodiments of the present invention. The arrow 56 represent heat flow out of the mixture 52 from the container 54. The local cooling may be generated by, inter alia, direct contact with a frozen substance (e.g., ice), a cold liquid, etc.

FIG. 11 depicts a food product 58 formed from the mixture 52 that was heated or cooled as described supra in conjunction with FIG. 9 or 10, in accordance with the embodiments of the present invention. The food product 58 includes, inter alia, any of the food products described supra.

Figure 12:
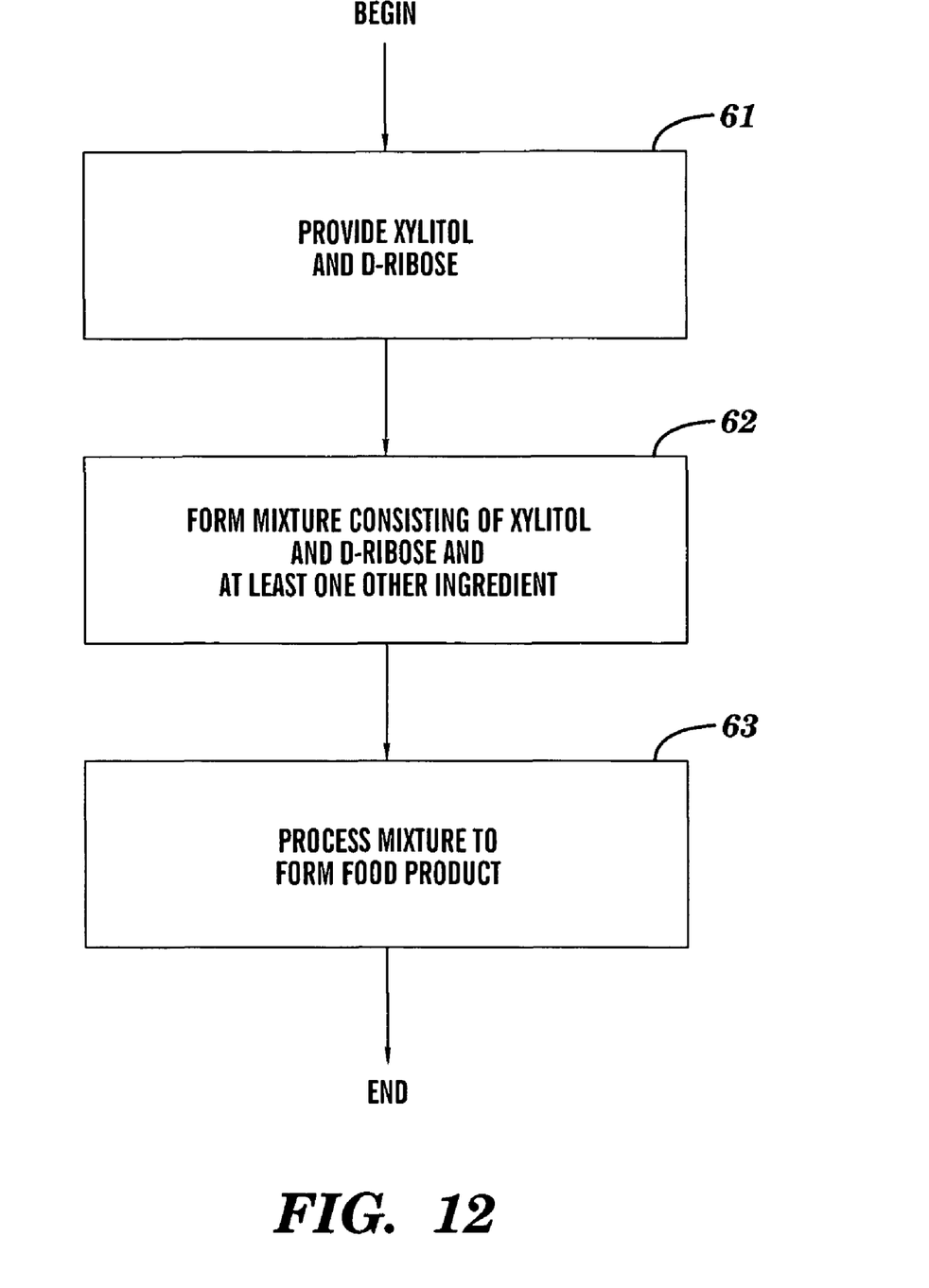
FIG. 12 is a flow chart for describing a method for forming the food product in FIG. 11 by the process associated with FIG. 9 or FIG. 10, in accordance with the embodiments of the present invention.

FIG. 12 is a flow chart in which steps 61-63 describe a method for forming the food product 58 in FIG. 11 by the process associated with FIG. 9 or 10, in accordance with the embodiments of the present invention. Step 61 provides xylitol and D-ribose. Step 62 forms a mixture (i.e., the mixture 52 of FIG. 9 or 10) consisting of xylitol and D-ribose and at least one other ingredient. Step 63 processes the mixture 52 of step 62 to form the food product 58 such as by heating or cooling (e.g., boiling, cooking, baking, roasting, toasting, freezing, etc.) the mixture 52 in accordance with FIG. 9 or 10. Alternatively, step 63 may process the mixture 52 of step 62 by a mechanical process (e.g., stirring, blending, etc. for) without any heating or cooling. Said mechanical process may distribute the xylitol and D-ribose more uniformly within the mixture 52.

While the process depicted in FIGS. 9-12 includes heating or cooling the mixture 52 to form the food product 58, the scope of the present invention includes forming the food product 58 without heating or cooling such as by, inter alia, mechanical processing (e.g., stirring, shaking, blending, layering, etc.)

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A food sweetener, consisting essentially of xylitol and D-ribose, wherein the xylitol and the D-ribose are in a mixture having a granular or powder form, and wherein the xylitol and the D-ribose are adhesively bound such that the mixture has a fixed shape and is not loose.

2. The food sweetener of claim 1, wherein the food sweetener is not comprised by a coating of a comestible, by a chewing gum, or by a chewable comestible unit.

3. The food sweetener of claim 1, wherein the xylitol comprises a weight percent (W) of the combined weight of the xylitol and the D-ribose, and wherein W is at least 1 and less than 20.

4. The food sweetener of claim 1, wherein the xylitol comprises a weight percent (W) of the combined weight of the xylitol and the D-ribose, and wherein W is at least 20 and less than 40.

5. The food sweetener of claim 1, wherein the xylitol comprises a weight percent (W) of the combined weight of the xylitol and the D-ribose, and wherein W is at least 40 and less than 60.

6. The food sweetener of claim 1, wherein the xylitol comprises W weight percent of the combined weight of the xylitol and the D-ribose, and wherein W is at least 60 and less than 80.

7. The food sweetener of claim 1, wherein the xylitol comprises a weight percent (W) of the combined weight of the xylitol and the D-ribose, and wherein W is in a range of 80 to 99.

8. A food structure, comprising a food product, wherein the food product consists of xylitol, D-ribose, and at least one other ingredient, wherein the at least one other ingredient does not include a sweetening agent wherein the food product is a food sweetener, and wherein the at least one other ingredient includes a vitamin, an antioxidant, or a combination thereof.

9. The food structure of claim 8, wherein the food product is not a coating of a comestible, a chewing gum, or a chewable comestible unit.

10. The food structure of claim 8, wherein the xylitol and D-ribose are each about uniformly distributed within the food product.

11. The food structure of claim 8, wherein the food product comprises a liquid.

12. The food structure of claim 8, wherein the food product comprises a snack food.

13. The food structure of claim 8, wherein the xylitol comprises a weight percent (W) of the combined weight of the xylitol and the D-ribose, and wherein W is at least 1 and less than 20.

14. The food structure of claim 8, wherein the xylitol comprises a weight percent (W) of the combined weight of the xylitol and the D-ribose, and wherein W is at least 20 and less than 40.

15. The food structure of claim 8, wherein the xylitol comprises a weight percent (W) of the combined weight of the xylitol and the D-ribose, and wherein W is at least 40 and less than 60.

16. The food structure of claim 8, wherein the xylitol comprises a weight percent (W) of the combined weight of the xylitol and the D-ribose, and wherein W is at least 60 and less than 80.

17. The food structure of claim 8, wherein the xylitol comprises a weight percent (W) of the combined weight of the xylitol and the D-ribose, and wherein W is in a range of 80 to 99.

18. A method of forming a food product, comprising:
providing a loose mixture consisting of xylitol, D-ribose, and at least one other ingredient, wherein the at least one other ingredient does not include a sweetening agent, wherein the loose mixture has a granular or powder form; and
heating the loose mixture at an elevated temperature and for a time duration sufficient to convert the loose mixture to a modified mixture such that the modified mixture has a fixed shape and is not loose.

19. The method of claim 18, further comprising cooling the modified mixture.

20. The method of claim 18, wherein said providing comprises providing the loose mixture of xylitol and D-ribose in a container having a geometrical shape, and wherein the fixed shape is in conformity with the geometrical shape of the container.

21. The method of claim 18, wherein the modified mixture is not comprised by a coating of a comestible, by a chewing gum, or by a chewable comestible unit.

22. The method of claim 18, wherein the loose mixture consists essentially of the xylitol and the D-ribose.

23. The method of claim 18, wherein the xylitol comprises a weight percent (W) of the combined weight of the xylitol and the D-ribose, and wherein W is at least 1 and less than 20.

24. The method of claim 18, wherein the xylitol comprises a weight percent (W) of the combined weight of the xylitol and the D-ribose, and wherein W is at least 20 and less than 40.

25. The method of claim 18, wherein the xylitol comprises a weight percent (W) of the combined weight of the xylitol and the D-ribose, and wherein W is at least 40 and less than 60.

26. The method of claim 18, wherein the xylitol comprises a weight percent (W) of the combined weight of the xylitol and the D-ribose, and wherein W is at least 60 and less than 80.

27. The method of claim 18, wherein the xylitol comprises a weight percent (W) of the combined weight of the xylitol and the D-ribose, and wherein W is in a range of 80 to 99.

28. The food structure of claim 8, wherein the food sweetener is not comprised by a coating of a comestible, by a chewing gum, or by a chewable comestible unit.

29. The food structure of claim 8, wherein the at least one other ingredient includes a vitamin.

30. The food structure of claim 8, wherein the at least one other ingredient includes a mineral.

31. The food structure of claim 8, wherein the at least one other ingredient includes an antioxidant.

32. A method of forming a food structure, said method comprising: forming the food structure of claim 8, wherein said forming the food structure comprises forming the food product consisting of said xylitol, said D-ribose, and said at least one other ingredient.

* * * * *